United States Patent
Freyermuth et al.

[11] 3,764,611
[45] Oct. 9, 1973

[54] N-(SUBSTITUTED SULFONAMIDOMETHYL)-2-PYRROLIDINONES

[75] Inventors: Harlan B. Freyermuth; David I. Randall, both of Easton, Pa.

[73] Assignee: GAF Corporation, New York, N.Y.

[22] Filed: Apr. 16, 1970

[21] Appl. No.: 29,297

[52] U.S. Cl. ..... 260/326.5 SF, 260/29.1 R, 252/542
[51] Int. Cl. ............................................. C07d 27/08
[58] Field of Search............................. 260/326.5 SF

[56] References Cited
UNITED STATES PATENTS
3,072,672  1/1963  Hickner et al. ..................... 260/307

Primary Examiner—Joseph A. Narcavage
Attorney—Samson B. Leavitt, Walter C. Kehm and Alvin H. Fritschler

[57] ABSTRACT

Sulfonamidomethyl derivatives of N-methyl-2-pyrrolidinone of the structural formula:

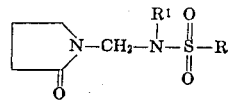

wherein R represents a hydrocarbon group such as alkyl, aryl, cycloalkyl, aralkyl or alkaryl and $R^1$ represents hydrogen, alkyl or aralkyl, are useful as non-volatile plasticizers for synthetic thermoplastic resins. They are prepared by the reaction of N-hydroxymethyl-2-pyrrolidinone with an appropriate hydrocarbyl sulfonamide in the presence of an acid catalyst.

11 Claims, No Drawings

N-(SUBSTITUTED SULFONAMIDOMETHYL)-2-PYRROLIDINONES

BACKGROUND OF THE INVENTION

1. Field of the Invention

This invention relates to N-(substituted sulfonamidomethyl) derivatives of N-hydroxymethyl-2-pyrrolidinone and methods for their production.

2. Description of the Prior Art

N-hydroxymethylpyrrolidinone is a compound known in the art as an intermediate in the preparation of dyestuffs. As taught in U.S. Pat. No. 3,073,843, this material is prepared by the reaction of pyrrolidinone and formaldehyde or a precursor of formaldehyde. This patent does not suggest the formation of other derivatives of this compound however. In addition, Chemical Abstracts, Volume 55, page 27267h (1961) discloses the reaction of N-chloromethyl-2-pyrrolidinone with a mixture of sodium methylate and menthanol to yield 64 percent of N-methoxymethyl-2-pyrrolidinone. Also, Chemical Abstracts, Volume 54, page 1286f (1960) teaches that N-chloromethyl-2-pyrrolidinone can be prepared in 87 percent yield by treatment of the methylol derivative with $SOCl_2$ in benzene solvent at 8°C.

In none of these prior art teachings, however, are there suggestions for preparation of N-sulfonamidomethyl derivatives of N-hydroxy-methyl pyrrolidinone which are useful as non-volatile plasticizers.

SUMMARY OF THE INVENTION

It is accordingly one object of the invention to provide N-sulfonamidomethyl derivatives of N-methyl-2-pyrrolidinone A further object of the invention is to provide N-(sulfonamidomethyl)-2-pyrrolidinones useful as non-volatile plasticizers.

A still further object of the invention is to provide methods for preparation of N-(sulfonamidomethyl)-2-pyrrolidinones.

Other objects and advantages of the present invention will become apparent as the description thereof proceeds.

In satisfaction of the foregoing objects and advantages, there are provided by this invention sulfonamidomethyl derivatives of N-hydroxymethyl-2-pyrrolidinone which have the following structural formula:

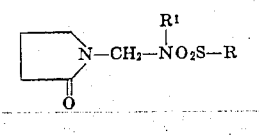

wherein R is a hydrocarbon group or substituted hydrocarbon group and $R^1$ is hydrogen, alkyl or aralkyl.

DESCRIPTION OF PREFERRED EMBODIMENTS

As indicated above, this invention is concerned with sulfonamidomethyl derivatives of N-hydroxymethyl-2-pyrrolidinone which are useful as non-volatile plasticizers for synthetic thermoplastic resins.

These novel products have the following general structural formula:

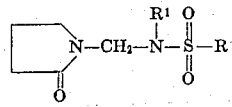

wherein R is a hydrocarbon or substituted hydrocarbon group and representative hydrocarbon groups for R include the following:

a. Alkyl groups and substituted alkyl groups of one to about 18 carbon atoms, either straight or branched chained, e.g., methyl, ethyl, n-propyl, isopropyl, n-butyl, isobutyl, n-pentyl, n-hexyl, nonyl, decyl, and dodecyl;

b. Cycloalkyl groups of three to about eight carbon atoms such as cyclopropyl, cyclobutyl, cyclopentyl, cyclohexyl, cycloheptyl and cyclooctyl;

c. Aryl and alkaryl groups of about six to about 15 carbon atoms wherein any alkyl substituent can contain up to about six carbon atoms, e.g. phenyl, o-, m- and p-xylyl, tolyl, phenyl substituted by one or more alkyl groups, 1-naphthyl, 2-naphthyl and the like; and d. Aralkyl groups such as benzyl, phenethyl and the like, having about six to 15 carbon atoms;

and $R^1$ is hydrogen, alkyl or aralkyl. Representative groups for $R^1$ include alkyl and substituted alkyl groups of one to about 18 carbon atoms, straight or branch chained, e.g. methyl, ethyl, n-propyl, isopropyl, n-butyl, isobutyl, n-pentyl, n-hexyl, nonyl, decyl, dodecyl, and the like. Also, $R^1$ may be an aralkyl group of six to about 15 carbon atoms including benzyl, phenethyl and the like.

As indicated above, the products of this invention have been found to be good non-volatile plasticizers for synthetic thermoplastic resins. They are also useful for the preparation of dyestuffs by diazotization of the amino group followed by coupling with any of various well known couplers to form azodyestuffs. Alternately the amino groups could be condensed with bromamine acid and similar compounds by known methods to produce dyestuffs. Further, when R in any of the compounds is a long chain alkyl group (or alkyl benzene group), i.e., contains at least eight carbon atoms or more, the products have interesting properties as surfactants, the long chain alkyl group being an hydrophobic group and the lactam group being an hydrophillic group so that the products have the proper hydrophobic-hydrophillic balance to be useful as surface active agents.

The compounds of this invention may be prepared by the reaction of N-hydroxymethyl-2-pyrrolidinone, (obtained as described in U.S. Pat. No. 3,073,843) with a sulfonamide of the formula:

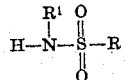

wherein R and $R^1$ are described above, in the presence of an acid catalyst. This reaction is conducted at a temperature ranging from about 50°C. up to about 100°C., preferably about 60°–80°C. The reactants are reacted in about stoichiometric ratios in the preferred aspect for best results although an excess of either reactant can be employed if desired.

As indicated, the reaction is conducted in the presence of an acid catalyst, either mineral acids, organic acids or mixtures thereof, the catalyst being utilized in a catalytic effective amount, e.g. about 0.01 to about 3.0 percent by weight. In many cases, it is necessary to add an additional amount of catalyst in order to complete the reaction. Suitable acid catalysts which may be used include mineral acids such as hydrochloric acid, sulfuric acid, phosphoric acid, phosphonic acid, nitric acid and the like. Organic acid catalysts which may be used include acetic acid, para-toluenesulfonic acid, benzenesulfonic acid, methanesulfonic acid, trichloroacetic acid and the like.

This reaction is preferably conducted at atmospheric pressure, although subatmospheric or superatmospheric pressure can be utilized as desired, and also in the absence of any solvent. The reaction is also preferably conducted under some degree of agitation.

The product from the reaction may be recovered by dissolving the reaction product in water while warm from which the final product will crystallize out on cooling and then may be recovered by conventional filtration. Yields from this reaction have been found to run about 70–90 percent.

While any of the sulfonamides described may be utilized in the process as covered by the formula given previously, the most preferred group of reactants are benzenesulfonamide, N-methylbenzene-sulfonamide, N-ethylbenzenesulfonamide, methane sulfonamide, ethanesulfonamide, cyclohexylsulfonamide, p-toluenesulfonamide, benzylsulfonamide, N-methylbenzylsulfonamide 1-naphthylsulfonamide, 2-naphthylsulfonamide, butanesulfonamide, octadecylsulfonamide, N-methyl octadecylsulfonamide, phenethylsulfonamide and the like. These products can be prepared by reaction of the appropriate hydrocarbon sulfonyl chloride with ammonia or the appropriate primary alkyl or aralkylamine.

The following examples are provided to illustrate the products and process of the invention but it is not to be considered as limited thereto.

EXAMPLE I

In a 250 ml. beaker was placed 11.5 grams (0.1 mole) of N-hydroxymethyl-2-pyrrolidinone and 15.7 grams (0.1 mole) of benzenesulfonamide. The two chemicals were mixed intimately with a glass stirring rod and the beaker with its contents was placed in a constant temperature oil bath adjusted to 70°–72°C. After about an hour of occasional stirring, the mixture melted down to a thin slurry. Seven drops (0.4 ml.) of concentrated hydrochloric acid (sp. g. 1.192) were added. After about one-half hour, the material set up to a hard mass. This was broken up with a spatula and heating at 70°–75°C. was continued for two hours. The material was removed from the beaker and placed in a 500 ml. Erlenmeyer flask and 400 ml. water added. The contents of the flask was heated to the boil to dissolve the product. Upon cooling to room temperature, the product crystallized out. The mixture was further cooled in an ice bath to 10°–15°C., then filtered in a Buchner funnel. The cake was washed with ice water and dried in a vacuum oven at 60°C. The dried material weighed 19.3 grams (76 percent of the theoretical yield) and melted at 164°–167°C.

For $C_{11}H_{14}N_2O_3S$

| | Calculated | Found |
|---|---|---|
| %N | 11.02 | 11.07 |
| %S | 12.61 | 12.59 |

The white crystalline product has the following structure:

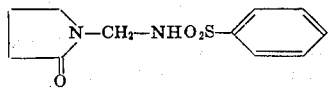

EXAMPLE II

The reaction of Example I was repeated except that the sulfonamide reactant used was 0.1 mole methanesulfonamide and the catalyst was 10 ml. of p-toluenesulfonic acid. Utilizing the same reaction conditions and work-up procedure there was obtained a good yield of N-(methanesulfonamidomethyl)-2-pyrrolidinone.

EXAMPLE III

The reaction of Example I was repeated except that the sulfonamide reactant was 0.1 mole of octadecylsulfonamide and the catalyst was phosphonic acid. Using the same reaction conditions there was obtained a good yield (71 percent of N-(octadecylsulfonamidomethyl)-2-pyrrolidinone.

EXAMPLE IV

To a 500 ml., 3-necked flask equipped with stirrer, thermometer and reflux condenser was added with stirring 23.0 grams N-hydroxymethylpyrrolidinone (0.2 mole), 39.8 grams N-ethyl-p-toluenesulfonamide (0.2) mole, and 150 ml. acetone. The mixture, with stirring, was heated to reflux until a clear solution resulted. The mixture was allowed to cool to room temperature and then seven drops of concentrated hydrochloric acid was added. The mixture was heated to reflux for four hours, then allowed to cool and stand overnight. The acetone was removed on a rotary evaporator. The residue was treated with 400 ml. water and 0.8 ml. 50% NaOH to pH 8.9. The water was removed, and product extracted with two 250 ml. portions benzene and anhydrous $MgSO_4$ added. After drying, the $MgSO_4$ was removed by filtration, and the benzene removed on the rotary evaporator. There was recovered 52.5 grams of clear viscous oil of chemical structure:

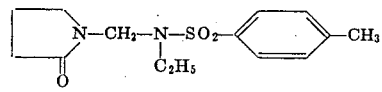

For $C_{14}H_{20}N_2O_3S$ calculated 9.45%N; found 9.34%N

The invention has been described herein with reference to certain preferred embodiments. However, the invention is not to be considered as limited thereto as variations thereon will become obvious to those skilled in the art.

What is claimed is:

1. A compound of the following structure:

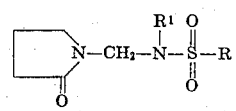

wherein R is selected from the group consisting of alkyl of one to 18 carbon atoms, either straight or branched chained, cycloalkyl of three to eight carbon atoms, aralkyl of six to 15 carbon atoms and aryl of six to 15 carbons atoms wherein the aryl groups may be further substituted by one or more alkyl groups of one to seven carbon atoms, and $R^1$ is selected from the group consisting of hydrogen, alkyl of one to 18 carbon atoms and aralkyl of six to 15 carbon atoms.

2. A compound according to claim 1 wherein R is selected from the group consisting of methyl, ethyl, n-propyl, isopropyl, n-butyl, isobutyl, n-pentyl, n-hexyl, nonyl, decyl, octadecyl, dodecyl, cyclopropyl, cyclobutyl, cyclopentyl, cyclohexyl, cycloheptyl, cyclooctyl, phenyl, tolyl, o-, m- and p-xylyl, 1-naphthyl, 2-naphthyl, benzyl and phenethyl and $R^1$ is selected from the group consisting of methyl, ethyl, n-propyl, isopropyl, n-butyl, isobutyl, n-pentyl, n-hexyl, nonyl, decyl, octadecyl, dodecyl, benzyl and phenethyl.

3. A compound according to claim 1 wherein R is methyl.

4. A compound according to claim 1 wherein R is phenyl.

5. A compound according to claim 1 wherein R is p-tolyl.

6. A compound according to claim 1 wherein R is octadecyl.

7. A compound according to claim 1 wherein R is ethyl.

8. A compound according to claim 1 wherein R is p-tolyl and $R^1$ is ethyl.

9. A process for the preparation of a compound of the formula:

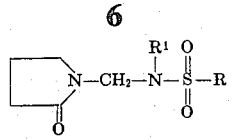

wherein R is selected from the group consisting of alkyl of one to 18 carbon atoms, either straight or branched chained, cycloalkyl of three to eight carbon atoms, aralkyl of six to 15 carbon atoms, aryl of six to 15 carbon, wherein the aryl group may be further substituted by one or more alkyl groups of one to seven carbon atoms, and $R^1$ is selected from the group consisting of hydrogen, alkyl of one to eight carbon atoms and aralkyl of six to 15 carbon atoms, which comprises reacting N-hydroxymethyl-2-pyrrolidinone with a sulfonamide of the formula:

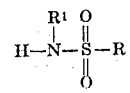

wherein R and $R^1$ are as described above, at a temperature ranging from about 50°C. up to about 100°C. in the presence of an acid catalyst.

10. A process according to claim 9 wherein the acid catalyst is selected from the group consisting of mineral acids, organic acids and mixtures thereof.

11. A process according to claim 10 wherein the temperature is maintained at about 60°–80°C.

* * * * *